United States Patent [19]

Delrosso et al.

[11] Patent Number: 5,383,051
[45] Date of Patent: Jan. 17, 1995

[54] COMPACT-SIZE OPTICAL AMPLIFIER

[75] Inventors: Giovanni Delrosso, Caltignaga; Stefano Vanoli, Verdellino; Massimo Armiraglio, Bottanuco, all of Italy

[73] Assignee: Pirelli Cavi S.p.A., Milan, Italy

[21] Appl. No.: 145,472

[22] Filed: Oct. 28, 1993

[30] Foreign Application Priority Data

Oct. 30, 1992 [IT] .................................... MI92-2501

[51] Int. Cl.⁶ .............................................. G02B 6/40
[52] U.S. Cl. ...................................... 359/341; 385/135
[58] Field of Search ................ 359/333, 341; 385/135

[56] References Cited

U.S. PATENT DOCUMENTS

| | | | |
|---|---|---|---|
| 4,428,645 | 1/1984 | Korbelak et al. | 385/135 |
| 4,911,519 | 3/1990 | Burton et al. | 385/135 |
| 5,214,444 | 5/1993 | Kerr et al. | 385/135 X |
| 5,222,183 | 6/1993 | Daems et al. | 385/135 |
| 5,285,515 | 2/1994 | Milanowski et al. | 385/135 |

FOREIGN PATENT DOCUMENTS

| | | | |
|---|---|---|---|
| 0349207 | 1/1990 | European Pat. Off. | G02B 6/42 |
| 0409258 | 1/1991 | European Pat. Off. | H01S 3/06 |
| 2181270 | 4/1987 | United Kingdom | G02B 6/36 |

OTHER PUBLICATIONS

Patent Abstracts of Japan, vol. 16, No. 85 Feb. 28, 1992–Abstract.
AT&T Bell Laboratories Technical Journal, vol. 17, No. 1, Jan. 1992 N.Y., USA, pp. 53–62.

*Primary Examiner*—Mark Hellner
*Attorney, Agent, or Firm*—Brooks Haidt Haffner & Delahunty

[57] ABSTRACT

The amplifier (1) comprises two active light guide sections (7,10), two dichroic couplers (5,8), two pump laser sources (6,8) acting on the active light guide sections (7,10) through the dichroic couplers (5,8), two directional couplers (3,11) associated with two respective optical meters (4,12), and light guide sections (14) for interconnecting the various components. The dichroic (5,8) and directional (3,11) couplers, and the optical meters (4,12), are pre-assembled onto an auxiliary frame (21); the active (7,10) and connection (14) light guide sections are wound on two drums (30) provided on an organizer frame (28). The auxiliary frame (21), organizer frame (28), and pump laser sources (6,9) are accommodated on a main frame (15).

9 Claims, 2 Drawing Sheets

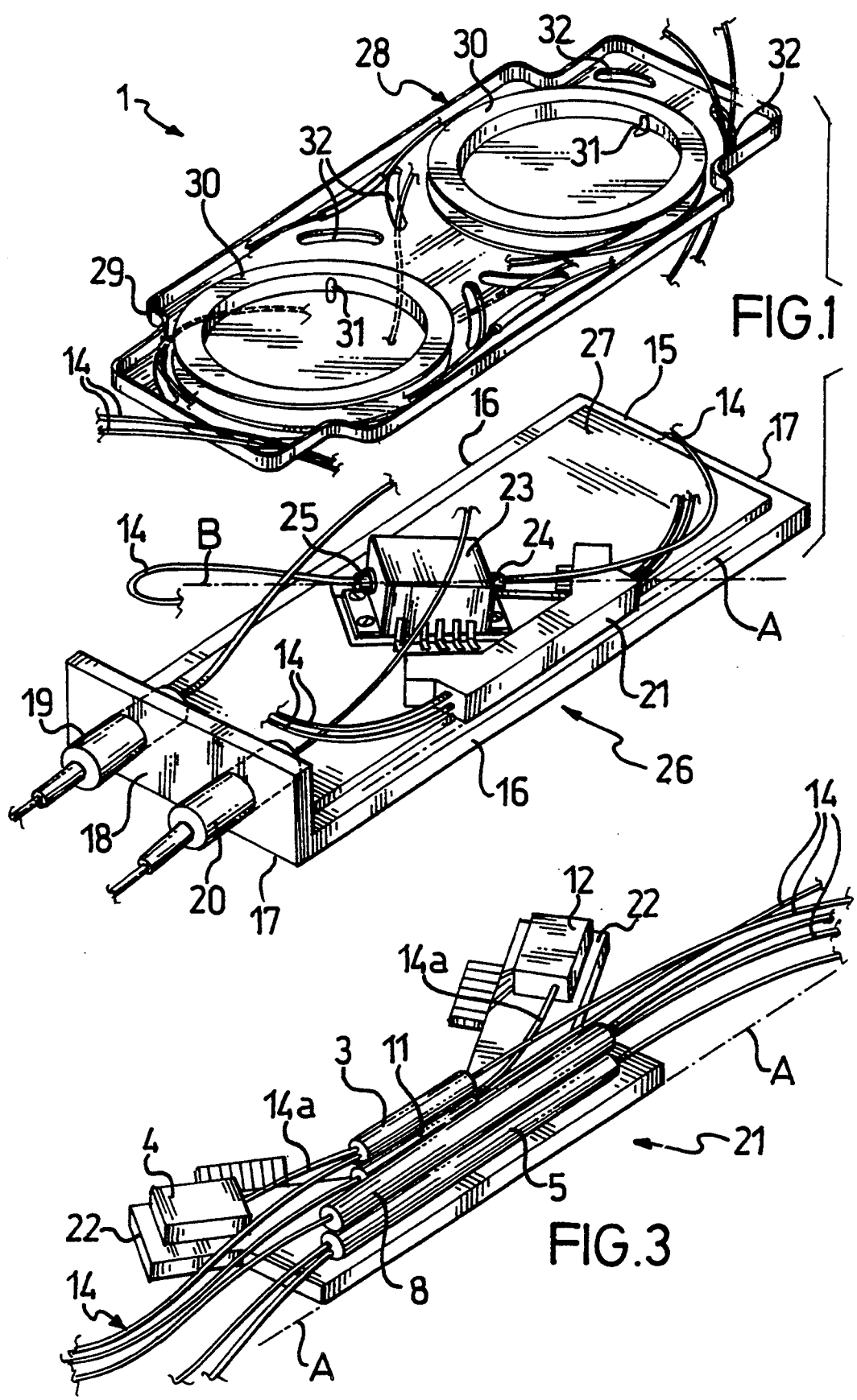

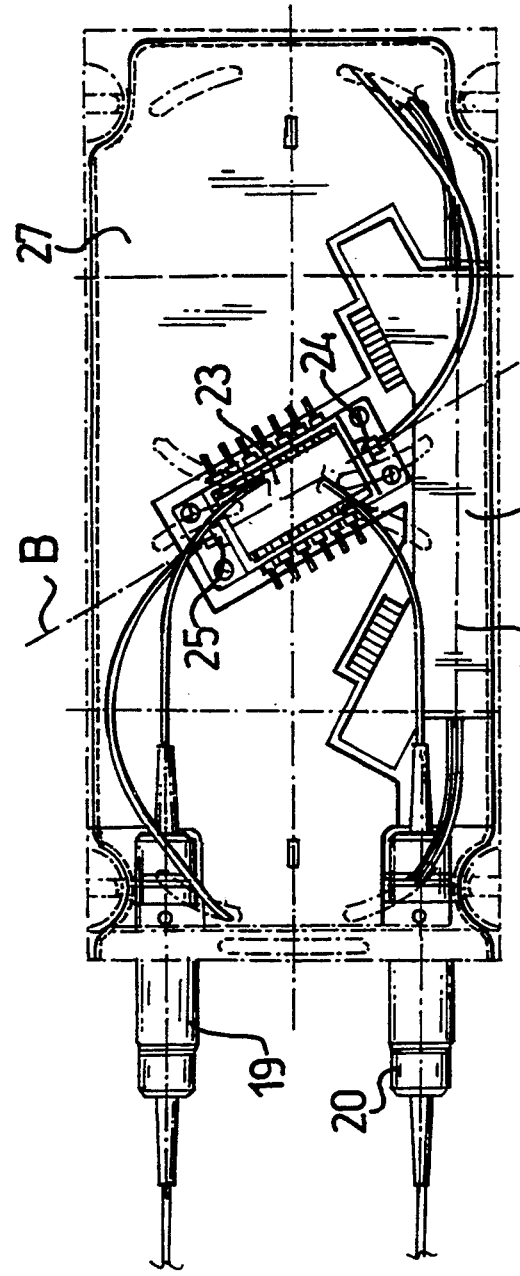
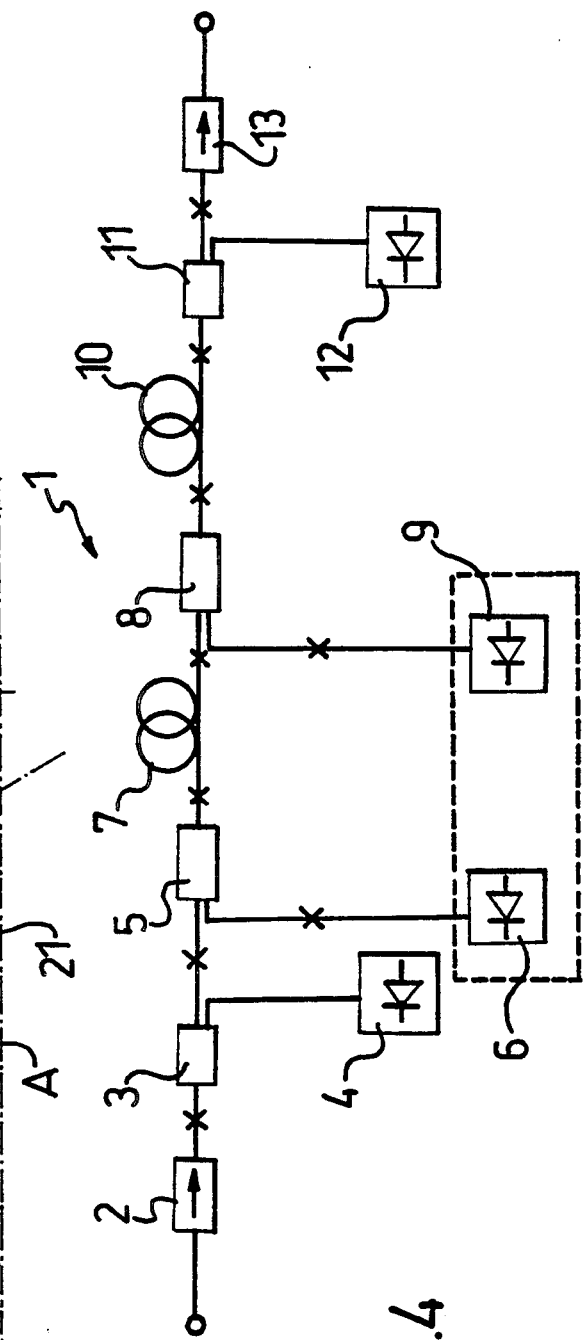

COMPACT-SIZE OPTICAL AMPLIFIER

BACKGROUND OF THE INVENTION

This invention relates to an optical amplifier. Optical amplifiers are devices useful to optically (i.e., without conversion to electrical or other signal types) amplify light signals being propagated through a fiber optics line.

In particular, so-called "on fiber" amplifiers are known wherein the amplifier element comprises a section of an active light guide as obtained by a doping process using special substances (typically rare earths); in going through that light guide section, the optical signal is amplified by pumping light energy from laser sources.

Occasionally, the amplification is split between two amplification stages, that is, two discrete sections of the active light guide. Two-stage optical amplifiers have been known, for instance, from U.S. Pat. No. 5,115,338 and European Patent Application EP 0509577.

The implementation of optical amplifiers, especially two-stage ones, poses space problems. In fact, the active light guide sections often have to be comparatively long—up to several tens of meters in length—and cannot be convoluted to less than a minimum bending radius for fear of attenuating the signal or possibly damaging the light guide beyond repair. In addition, the amplifier is to accommodate a number of optical, electronic, and electrical components. Lastly, several interconnection light guide sections must be provided between the various components which require to be sufficiently long; indeed, light guide splicing problems are likely to be encountered (during the amplifier assembly process), whereby some light guide excess length must be conceded to allow for reiterate splicing of a light guide.

Further, the splicing operation requires that purposely designed equipment be operated close to the amplifier outer case, on the exterior thereof for space reasons; also on this account, a sufficient length of the light guide should be made available fop use as a starter to said equipment during the assembly process.

In the field of devices attendant to fiber optics lines, joining devices are known—particularly intended for light guides including a large number of individual fibers—which address the problem of providing for a rational layout of the light guide allowance within a case. Devices of this kind are known, for instance, from U.S. Pat. Nos. 4,428,645; 4,679,896; 4,687,289 and 4,619,499.

It should not be overlooked, however, that the problems affecting the joining devices differ from those of optical amplifiers. In fact, the joints include no other optical or electrical components besides the light guide, whereby the difficulties inherent to the mutual optical connection of several components, as are typical of an optical amplifier, are non-existent. Further, the demand fop compact size is mope stringent on an optical amplifier, despite this being a much more complicated construction than a joint; indeed, whereas a joint is normally a stand-alone component somewhere along a light guide, an amplifier requires to be housed inside a cabinet or a cabin together with other components.

In a typical arrangement including a single amplification stage, an optical amplifier would comprise a section of an active light guide, a dichroic coupler, a pump laser source arranged to act on the active light guide section through the dichroic coupler, a directional coupler associated with a respective optical meter, and light guide sections interconnecting the various components.

Where plural amplification stages are used, the number of the components would increase; as an example, in a typical two-stage arrangement, the optical amplifier would comprise two sections of active light guide, two dichroic couplers, two directional couplers associated with two respective optical meters, and light guide sections interconnecting the various components.

BRIEF STATEMENT OF THE INVENTION

This invention concerns an amplifier of this type, having one or more stages and being characterized in that it comprises:

- an auxiliary frame accommodating both the dichroic couplers and the directional couplers, laid parallel to one another and to a longitudinal axis of the auxiliary frame, and the optical meters;
- an organizer frame;
- two winding drums provided on the organizer frame at spaced-apart abreast locations, with the active and connection light guide sections being wound on the drums; and
- main Frame carrying the organizer frame, auxiliary frame and pump laser sources.

A laser source (laser for brevity) is an element, preferably a laser diode, operative to issue coherent light at a predetermined wavelength. The dichroic coupler is a particular optical coupling means effective to couple into a single light guide, signals from different light guides, in particular to couple into the active light guide, the pumping signal from the pump laser source and the transmission signal. The term optical meter means here a component, preferably a photodiode, adapted to measure the strength of an optical signal. The term directional coupler means a component operative to split an input optical signal into two fractions to two outgoing light guides; for example, an on-fiber coupler is used having a separation ratio of 95/5 between the direct and the deflected signals.

This arrangement affords a rational utilization of the space available, resulting in greatly reduced amplifier bulk.

Preferably, the drums are identical and the main and organizer frames are substantially rectangular in shape.

The auxiliary frame is preferably mounted in a central area (relative to one of the frame base dimensions) of the main frame with its longitudinal axis substantially tangent to both drums, in the installed condition of the organizer frame on the main frame.

For the purpose of this invention, the expression "substantially tangent" means having a direction such that the light guide being wound on the drum will undergo a deflection corresponding to a smaller radius of curvature than the minimum admissible bending radius for the light guide within the amplifier. Preferably, this deflection is less than 10°.

The tangent condition enables the light guide sections issuing from the auxiliary frame components to be readily wound on the drums without creating such sharply bent regions as may harm the light guide.

Advantageously, the auxiliary frame locates laterally of the two drums, in a position where the two drums are tangent to the frame axis on the same side thereof. This position is preferred because of the elongate shape of the auxiliary frame.

Similarly, it is preferred that the pump laser sources be mounted in a central area of the main frame, with their outputs aligned to a main laser axis substantially tangent to both drums, in the installed condition of the organizer frame on the main frame.

In fact, the tangent condition, in connection with the laser positioning, enables the light guide sections exiting the lasers to be also comfortably wound on the drums without creating sharp bends of potential harm to the light guide.

Preferably, the pump laser sources are set askew midway between the two drums, whereby the two drums will be tangent to the laser main axes from opposite sides thereof. This positioning is preferred on account of the compact size of the two lasers.

Preferably, the two pump laser sources are mounted in the same case with aligned opposing outputs.

Advantageously, the organizer frame is mounted on the main frame above the pump laser sources and the auxiliary frame, and is apertured to let the light guide sections through.

In practice, with this arrangement, the light guide winding drums will lie on a separate plane from all the other components, to thereby facilitate the amplifier assembling; in fact, the connection light guide sections issuing from all the components accommodated on the auxiliary and main frames can be routed (through the apertures) to overlie the organizer frame And properly spliced there together and to the active light guide sections, after being wound on either or both of the drums.

To Further facilitate the assembling procedure, the auxiliary frame forms a pre-assembled unit, including the dichroic couplers, directional couplers, and optical meters. Consequently, during the amplifier final assembly, it will be unnecessary to arrange for mutual alignment of the various components accommodated on the auxiliary frame; in particular, a direct connection of the directional couplers to their respective optical meters becomes feasible using a very short section of interconnecting light guide, to thereby avoid affecting the oncoming signal to the optical meters, as may happen instead with longer light guide sections.

Advantageously, the organizer frame is substantially tray-like in shape, with a retaining peripheral edge that extends externally of the drums. This shape is favorable to the light guide winding around the drums and enables any slack light guides to be kept on track.

DETAILED DESCRIPTION

Further features and advantages of an optical amplifier according to the invention will become apparent from the following detailed description of a preferred embodiment thereof, to be read in conjunction with the accompanying drawings. In the drawings:

FIG. 1 is an exploded perspective view of an amplifier according to the invention;

FIG. 2 is a plan view of the main frame of the amplifier in FIG. 1;

FIG. 3 is an enlarged perspective view of the auxiliary frame of the amplifier in FIG. 1; and FIG. 4 is an (optical) circuit diagram of the amplifier in FIG. 1.

Generally shown at 1 in the drawings is an optical amplifier, e.g. a two-stage amplifier, comprising (in this order along the optical path, in the embodiment illustrated by FIG. 4) an imput insulator 2, first directional coupler 3 connected to a first optical meter 4, first dichroic coupler 5 connected to a first pump laser source 6, first section 7 of active light guide, second dichroic coupler 8 connected to a second pump laser source 9, second section 10 of active light guide, second directional coupler 11 connected to a second optical meter 12, and output insulator 13. The light guide sections interconnecting the various components are all indicated at 14 and have excess lengths to allow fop both splicing, and re-splicing should the former come out bad.

As mentioned, this arrangement ( shown in FIG. 4), wherein the pumping of energy through the active light guide sections takes place in the same direction as the running optical signal, is only discussed herein by way of example. The various components could be connected in different ways, e.g. as described in the aforementioned European Patent Application EP 0509577, wherein the pumping through the input stage occurs in the opposite direction. One or both of the insulators 2 and 13 may be omitted, contingent on the amplifier type.

The amplifier 1 comprises a main frame 15 in the form of a substantially rectangular plate having two long sides 16 and two short sides 17. At one of the short sides 17, the frame 15 is provided with a front plate 18 having an input connector 19 and output connector 20 fitted thereon for connection to the optical line. The input connector 19 has the input insulator 2 incorporated thereto, and the output connector 20 likewise has the output insulator 13 fitted therein, where such insulators ape provided. Two connection sections 14 of light guide extend from the connectors 19 and 20 to the interior of the amplifier 1.

With specific reference to FIG. 3, the amplifier 1 includes an auxiliary frame 21 in the form of an elongate plate having two obliquely set wings 22.

The auxiliary frame 21 accommodates two dichroic couplers 5, 8 and the two directional couplers 3, 11, all laid parallel to one another along a longitudinal axis A of the auxiliary frame 21. On the auxiliary frame 21, specifically on the wings 22 thereof, there are also accommodated the two optical meters 4 and 12, which are directly connected to the respective directional couplers 3 and 11 by short connection light guide sections, shown at 14a, for which no length allowance is provided. From all the components there extend connection light guide sections, specifically ten such sections: two from each directional coupler 3, 11 (additionally to the two short sections 14a) and three from each dichroic coupler 5, 8.

The auxiliary frame 21 is pre-assembled complete with all its components, such that it can be used as a unit (requiring but ten connections) in the implementation of the amplifier 1.

The pump laser sources 6 and 9 are clustered in a single body 23 having two optical outputs 24 and 25 located opposite from each other and aligned to a main axis B. The body 23 and auxiliary frame 21 are accommodated in a central area 26 of the main frame 15, at a location to be explained.

The amplifier 1 also includes a board 27 comprising all such electrical and electronic components as are required for powering and controlling the opto-electrical components. This board 27 is known per se and no further described herein because immaterial as far as bulk is concerned.

The amplifier 1 further includes an organizer frame 28 in the form of a substantially rectangular plate having a raised peripheral edge 29 resulting in a tray-like shape. The organizer frame 28 carries, inside the edge 29, two winding drums 30 being alike and held apart in side-by-side relationship. The drums 30, whose radius is at least equal to the minimum admissible bending radius before the fiber optics are in danger of being harmed, may either be a unitary construction or secured as by means of tabs 31. Apertures 32 are opened in the organizer frame 28 for routing the connection light guide sections 14 therethrough. Wound on either or both of the drums 30 are the active light guide sections 7 and 10, as well as part of the connection light guide sections 14.

The minimum admissible bending radius for the light guides within the amplifier is preferably 22 mm.

The organizer frame 28 is mounted on the main frame 15 above the body 23, together with the pump laser sources 6 and 9, the auxiliary frame 21, and the board 27. Accordingly, the optical and electronic components of the amplifier 1 will locate beneath the organizer frame 28, and all the light guide sections (including the active 7, 10 and connection 14 light guide sections) locate above it.

The body 23 is set obliquely across the main frame 15 between the two drums 30 such that the main axis B of the lasers 6 and 9 will lie substantially tangent to both drums 30 and leave the drums 30 from opposite ends.

On the other hand, the auxiliary frame 21 is located laterally of the two drums 30, at the middle of one of its long sides 16 such that the two drums 30 will be tangent to the axis A on the same side.

Finally, the amplifier 1 has a closing top cover, not shown. To assemble the amplifier 1, the two connectors 19 and 20 (along with the insulators 2 and 13, where provided), pro-assembled auxiliary frame 21, body 23, and board 27 are mounted on the main frame 15. Fourteen connection light guide sections 14 will be associated with these components.

The active light guide sections 7 and 10 are wound on one or both drums 30 of the organizer frame 28.

Thereafter, the organizer frame 28 is installed, being careful to pass all the light guide sections 14 through the apertures 32. Once the frame 28 has been positioned, the fourteen connection light guide sections 14 and Four ends of the active light guide sections 7, 10 are spliced together in accordance with a desired circuit layout (e.g. that shown in FIG. 4). Expediently, and in order to promote proper coupling, the various light guide sections may be color coded.

Finally, the amplifier 1 is closed under the cover. The rational layout of the various components within the amplifier 1 makes for a highly compact design, as well as easier assembly procedures by virtue of the light guide splicing being performed with the light guides all within easy reach on one plane.

Additionally, the central positioning of the lasers 6, 9 on the main frame 15 enhances dissipation of the heat generated by the lasers themselves. In fact, inasmuch as the plane of the main frame 15 is preferably made of a thermally conductive material, its entire surface is effectual to dissipate heat and lower the temperature in the neighborhood of the body 23, despite the small size of the main frame 15.

The structure of this invention allows the overall size of the amplifier to be kept small, close to the minimum consistent with the light guide bending radius requirement, and substantially within the outline of the two facing drums loaded with the light guides.

Further, the inventive structure, thanks also to the pre-assembled auxiliary frame 21 provided, makes For significantly easier assembling of the amplifier 1, especially as relates to the critical step of splicing the connection light guide sections 14.

The dichroic 5, 8 and directional 3, 11 couplers, moreover, can be orderly laid within the amplifier 1 structure despite their longitudinal dimensions, without imposing constraint on the layout of the associated connection light guide sections 14.

The auxiliary frame 21 assembling, being carried out separately on suitable equipment, particularly as regards the connection of the directional couplers to their respective optical meters, affords best conditions of operation and optical transmission for the meters without constraints from the rest of the components and the amplifier construction.

We claim:

1. An apparatus for organizing the components of an optical amplifier, comprising an active light guide section (7,10), a dichroic coupler (5,8), a pump laser source (6,9) acting on the active light guide section (7,10) through the dichroic coupler (5,8), a directional coupler (3,11) associated with a respective optical meter (4,12), and connection light guide sections (14) between the various components, characterized in that said apparatus comprises:

an auxiliary frame (21) accommodating both the dichroic (5,8) and directional (3,11) couplers as laid parallel to one another and to a longitudinal axis (A) of the auxiliary frame (21), and the optical meter (4,12);

a organizer frame (28);

two winding drums (30) provided on the organizer frame (28) side-by-side in spaced relationship, the active (7,10) and connection (14) light guide sections being wound on the drums (30); and a main frame (15) having the organizer frame (28), auxiliary frame (21), and pump laser source (6,9) mounted thereon.

2. An apparatus according to claim 1, wherein the auxiliary frame (21) is mounted in a central area on the main frame (15) with its longitudinal axis (A) substantially tangent to both drums (30), in the installed condition of the organizer frame (28) on the main frame (15).

3. An apparatus according to claim 2, wherein the auxiliary frame (21) is positioned laterally of the two drums (30) at a location such that both drums (30) will lie tangent to the axis of the auxiliary frame (21) on the same side thereof.

4. An apparatus according to claim 1, wherein the pump laser source (6,9) is mounted in a central area on the main frame (15) with an output aligned to a main axis (B) of the pump laser source substantially tangent to both drums (30), in the installed condition of the organizer frame (28) on the main frame (15).

5. An apparatus according to claim 4, wherein the pump laser source (6,9) is set obliquely midway between the two drums (30), whereby both drums (30) will lie tangent to the main axis (B) of the pump laser source (6,9) on opposite sides thereof.

6. An apparatus according to claim 1, wherein the organizer frame (28) is mounted on the main frame (15) above the pump laser source (6,9) and the auxiliary frame (21), and is formed with apertures (32) for passing the light guide sections (14) therethrough.

7. An apparatus according to claim 1, wherein the auxiliary frame (21) forms, with the dichroic coupler (5,8), the directional coupler (3,11), and the optical meter (4,12), a pre-assembled unit.

8. An apparatus amplifier according to claim 1, wherein the drums (30) are alike and the main (15) and organizer (28) frames are substantially rectangular in shape.

9. An apparatus according to claim 1, wherein the organizer frame (28) has a substantially tray-like shape with a retaining peripheral edge (29) provided externally of the drums (30).

* * * * *